United States Patent Office.

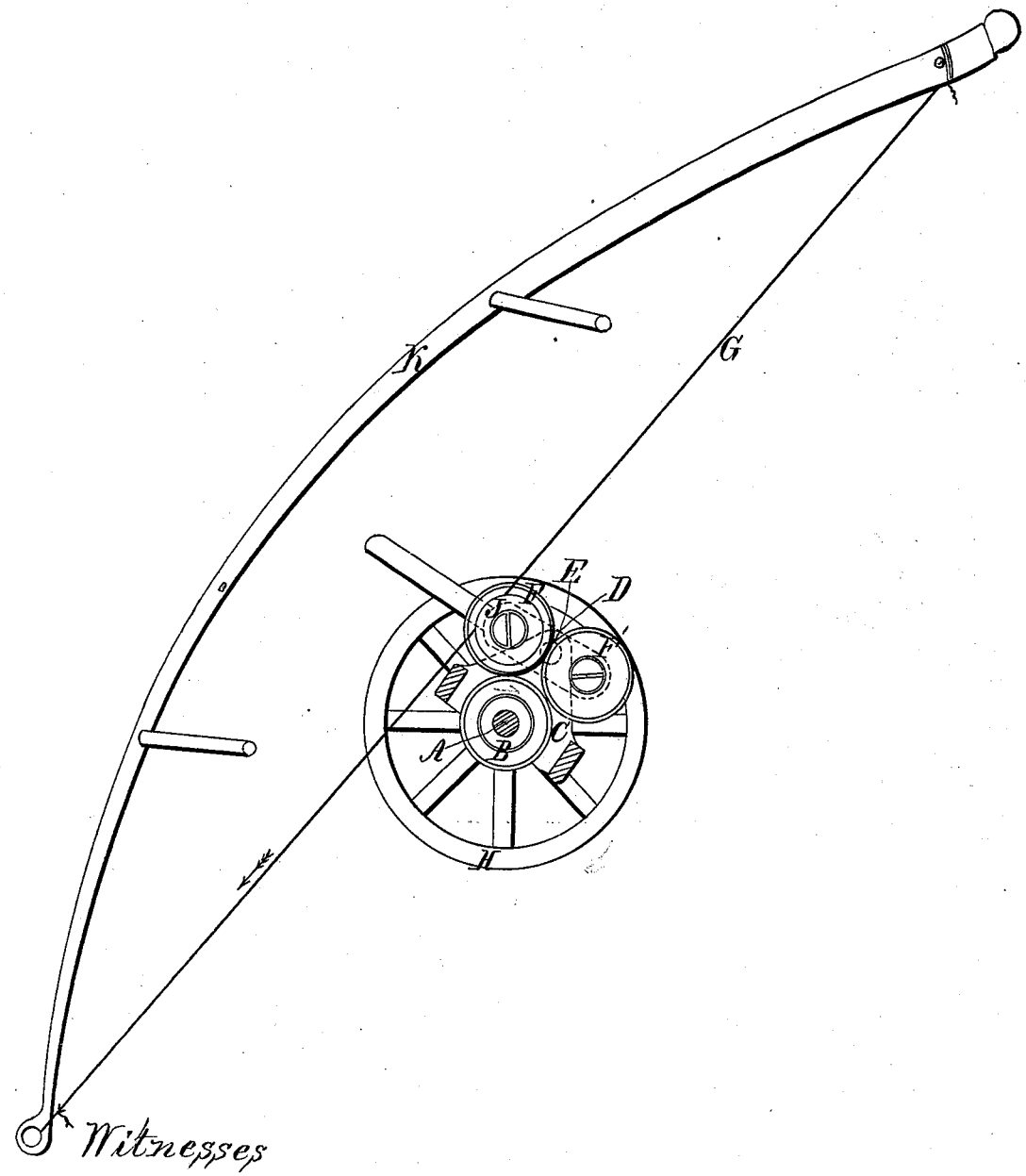

MARCUS A. HARDY, OF CAMBRIDGE, MASSACHUSETTS.

Letters Patent No. 96,316, dated November 2, 1869.

IMPROVEMENT IN MECHANICAL MOVEMENTS.

The Schedule referred to in these Letters Patent and making part of the same.

I, MARCUS A. HARDY, of Cambridge, in the county of Middlesex, and State of Massachusetts, have invented an Improvement in Mechanical Movements, of which the following description, made with reference to an accompanying drawing, representing the device in end elevation, is an accurate specification.

This is an invention for converting reciprocating rectilinear motion into continuous rotary. It is also capable of converting reciprocating into continuous rotary.

Its nature consists in mounting, on the ends of a rocking-arm, pivoted, at its centre; two gear-wheels, meshing constantly into each other, and alternately meshing with a third wheel on the shaft to be rotated. The power is applied to one of these wheels in such a way, that by the vibration of the arm, it is alternately rocked in and out of gear with the shaft-pinion, and the pivot of the arm is adjusted at such a distance from the shaft, usually slightly greater than the united semi-diameters of the pinion on the shaft and the pinions on the arm, that when one of them is rocked out of gear, the other shall be thrown in.

In the drawing—

A is the rotating shaft.

It carries a fly, H, and a pinion, B.

The fixed frame C furnishes its bearing. One side of this frame is made with an ear.

At D is pivoted the rocking-arm E, having a slight motion about pivot D.

At each end of this arm are placed the gear-wheels F F', meshing together, and on one of them, as F, is placed the belt-pulley J.

Around this is wrapped cord G, the string of bow K. When this cord is moved in the direction of the arrow, wheel F is revolved in that direction also, and, by the partial rotation of arm E, is meshed with pinion B, revolving it and its shaft A in the opposite direction.

The motion of cord G being reversed, wheel F is drawn away from pinion B, and wheel F' thrown into gear with it; but, as wheel F is now revolving in an opposite direction to that of the forward stroke, wheel F' revolves as wheel F did formerly, and, consequently, the motion of pinion B is unchanged. Any reciprocating rectilinear motion may be arranged to actuate this train, and the bow and cord are, therefore, only an illustration. Considering wheel F as the source of power, this train may be looked upon as a device for converting reciprocating rotary motion into continuous.

Reciprocating rectilinear motion should be delivered as nearly at right angles to arm E as convenient. The drawing represents friction-gear, and this, for light work, may be rubber-edged to advantage. Spur-gear may also be employed for heavier work. If used, the constructor must so proportion the distance of pivot D from shaft A, and so arrange the length of the teeth, that, as wheel F goes out of gear, F' may engage, and vice versa. If the vibration of arm E be allowed to be about twice as great as the length of the gear-teeth, the proportion would be good. If we make wheels F and F' of different sizes, or the arms of E of different lengths, the motion of pinion B may be rendered variable, and even intermittent.

I claim, as my invention, and desire to secure by Letters Patent—

The arrangement of wheels F F', gearing together upon the opposite ends of the rocking-arm E, and each of them alternately meshing with pinion B, substantially as and for the purpose described.

MARCUS A. HARDY.

Witnesses:
THOMAS W. CLARKE,
E. A. CLARKE.